J. WILSON.
VALVE MECHANISM.
APPLICATION FILED JUNE 29, 1911.
1,084,992.
Patented Jan. 20, 1914.
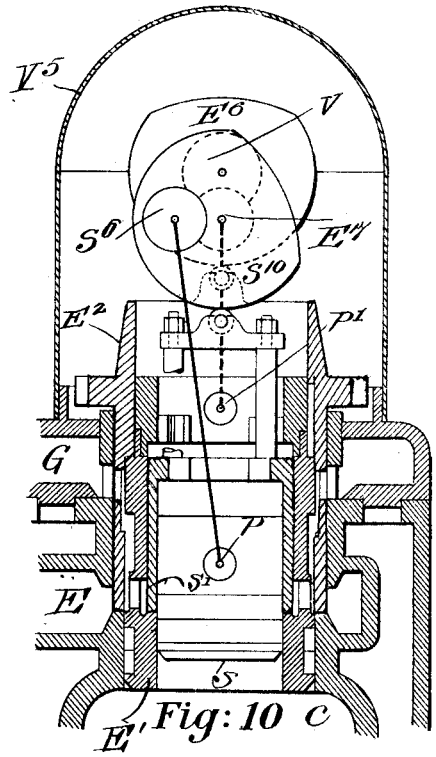
Fig: 10
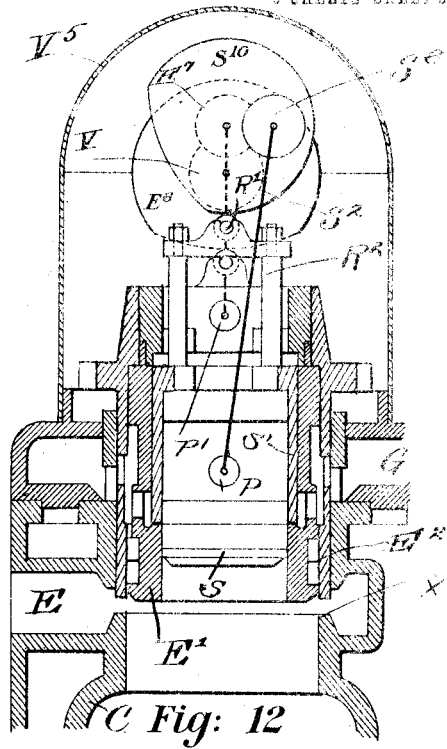
Fig: 12
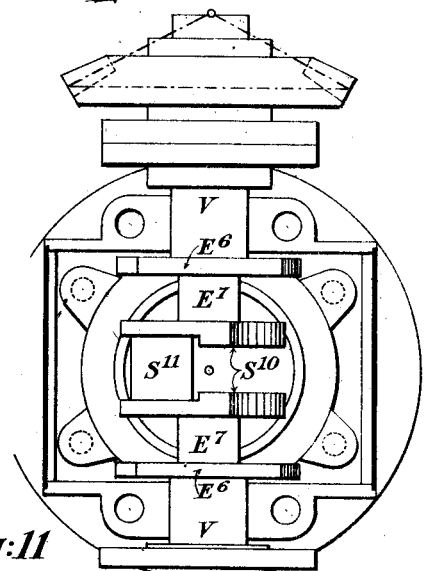
Fig: 11
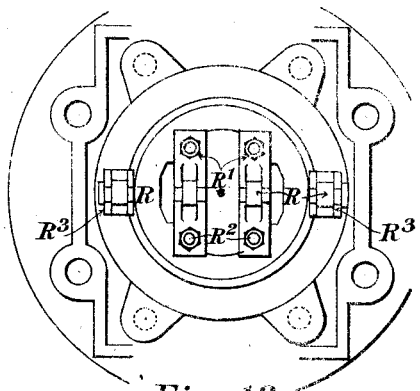
Fig: 13
Witnesses
Inventor
James Wilson J. WILSON.
VALVE MECHANISM.
APPLICATION FILED JUNE 29, 1911.
1,084,992.
Patented Jan. 20, 1914.
6 SHEETS—SHEET 6.
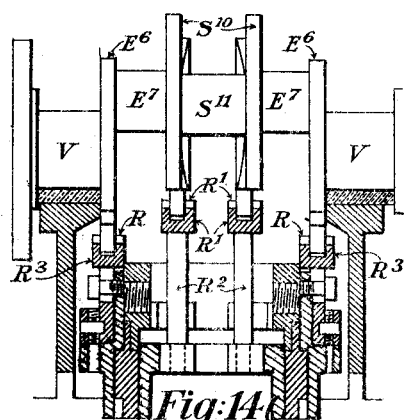
Fig: 14
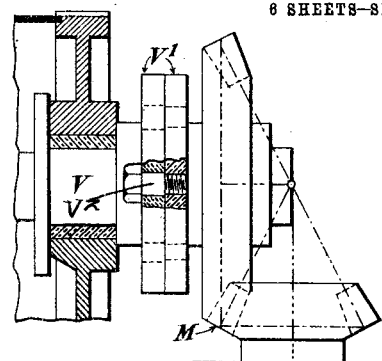
Fig: 16
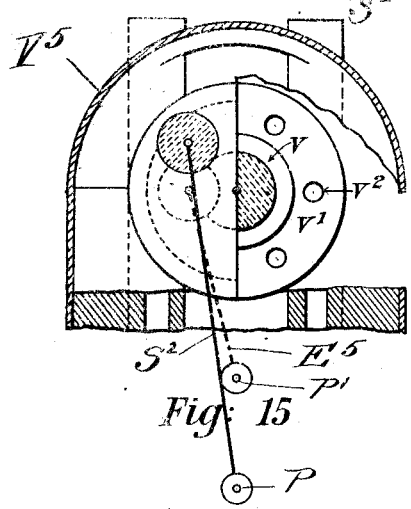
Fig: 15
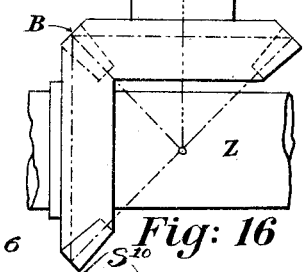
Fig: 17
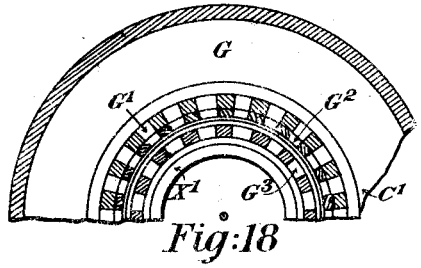
Fig: 18
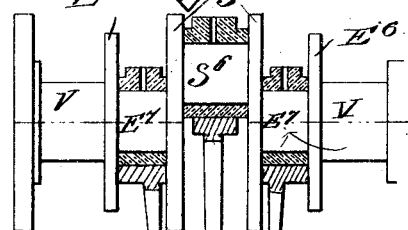

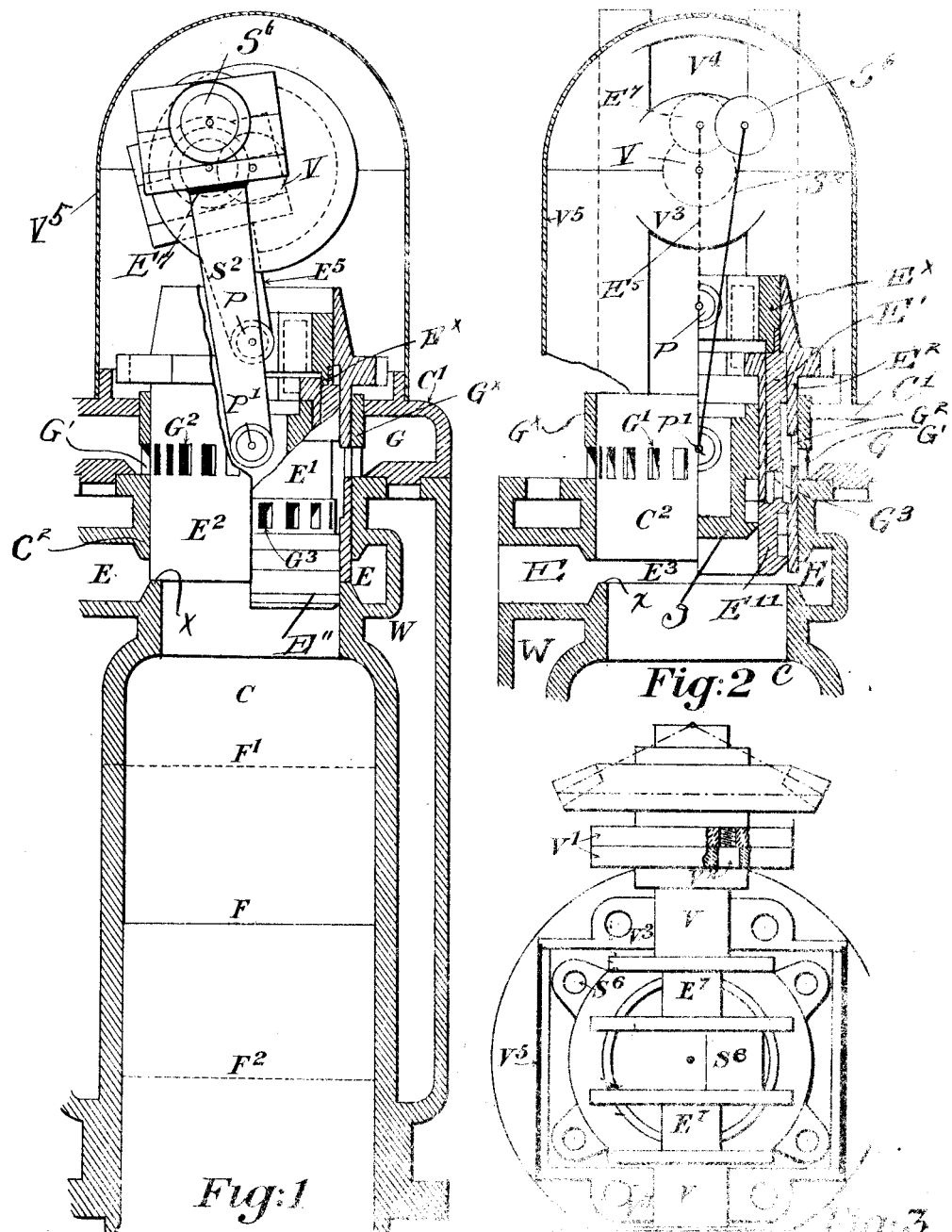

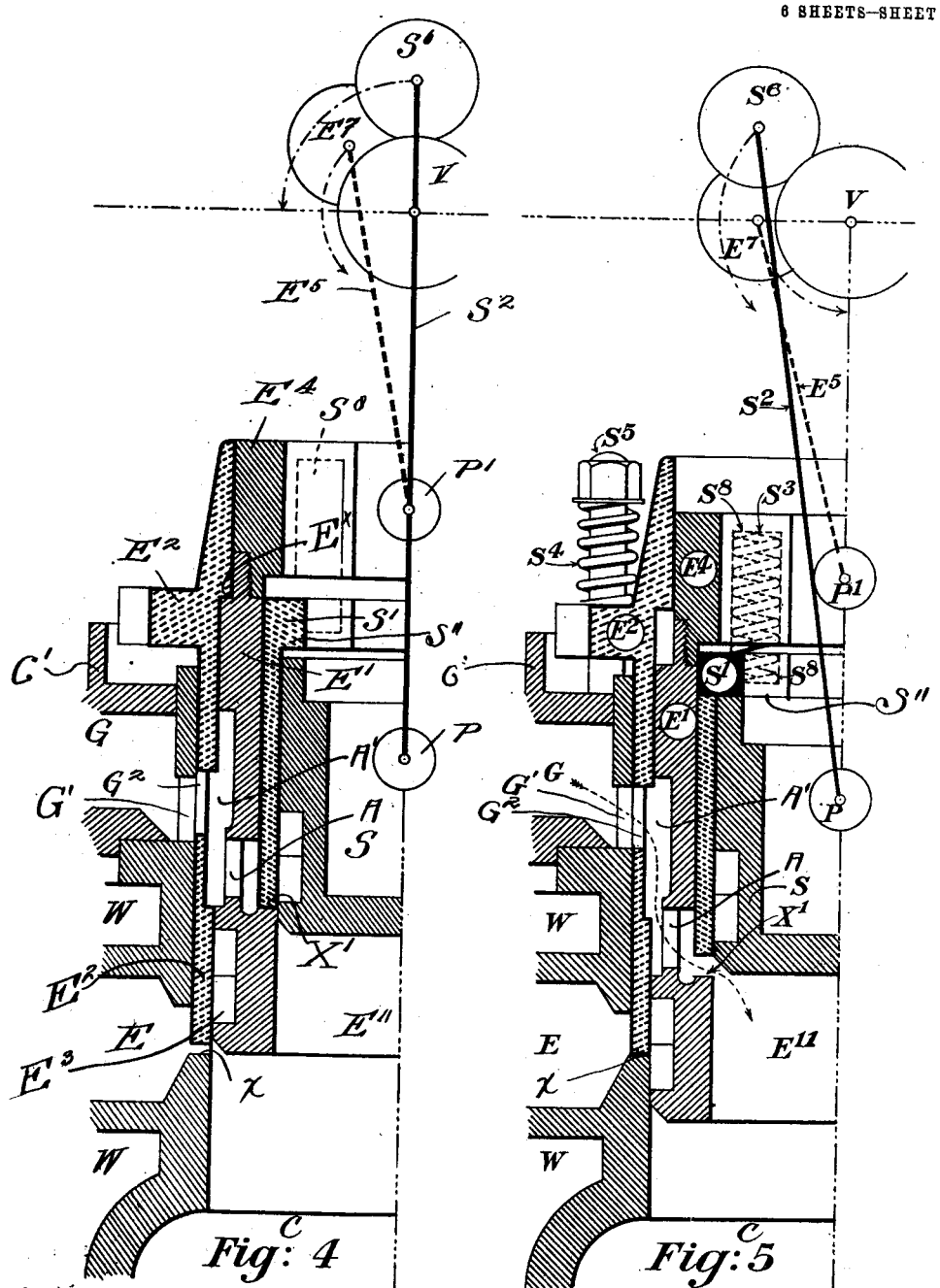

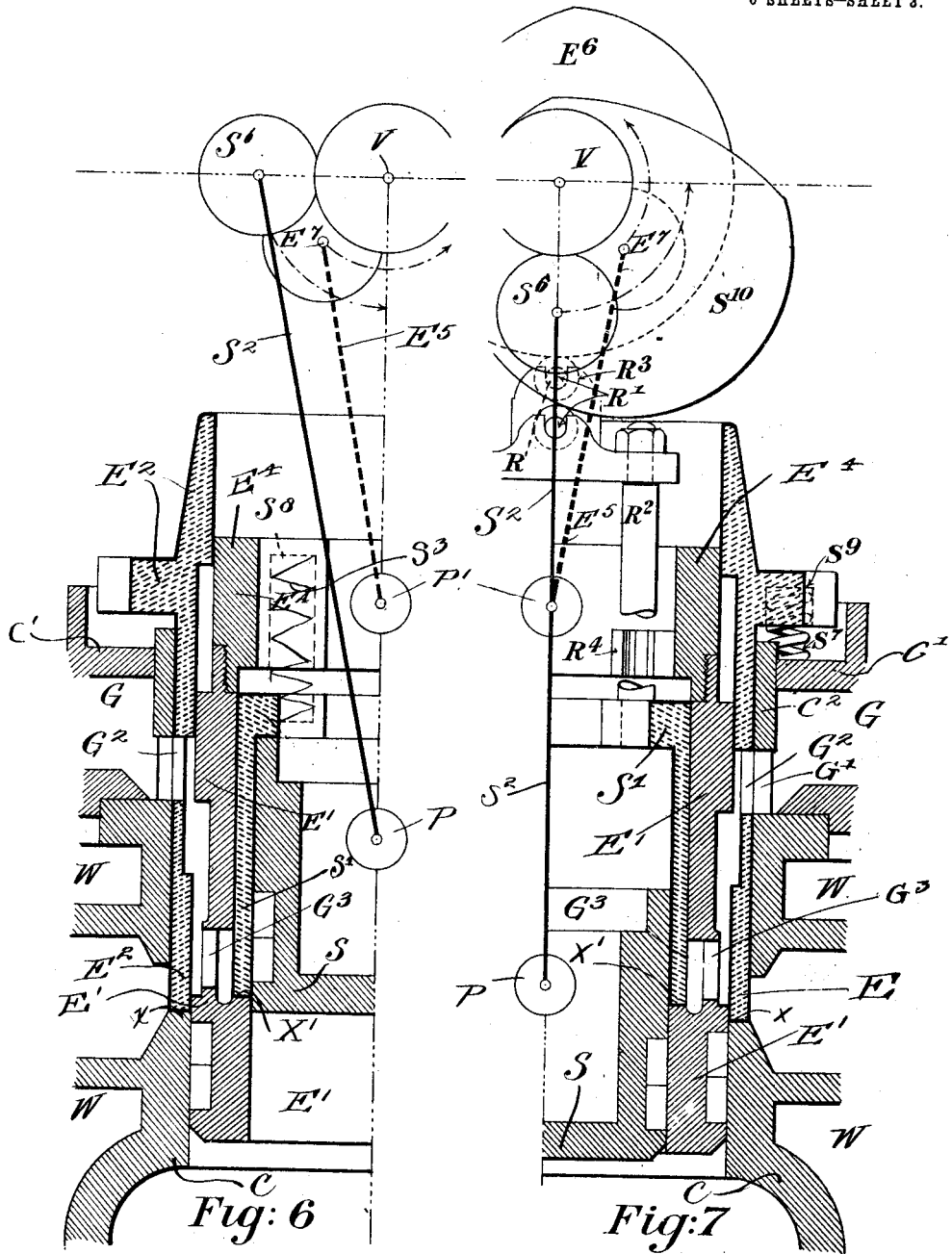

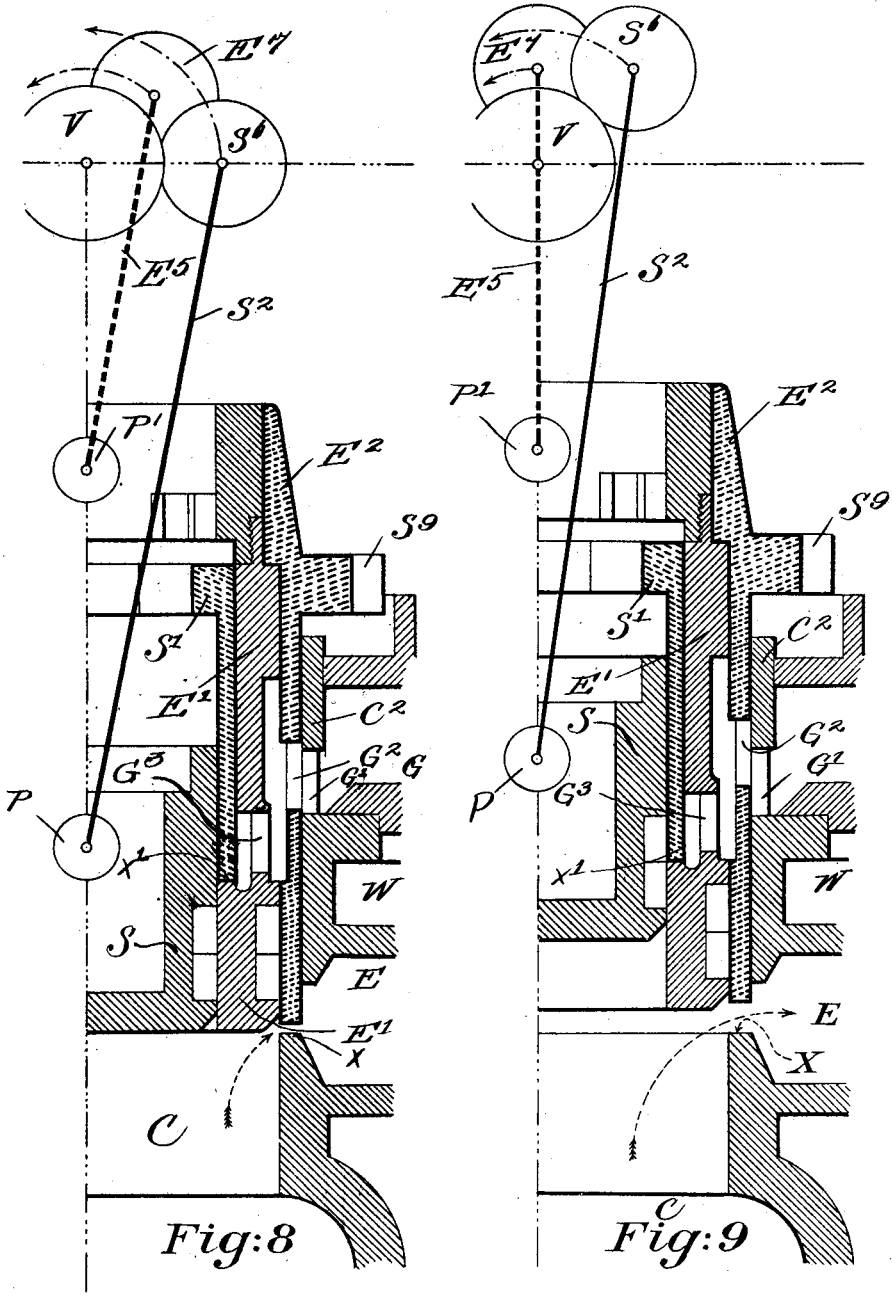

UNITED STATES PATENT OFFICE.

JAMES WILSON, OF BRISBANE, QUEENSLAND, AUSTRALIA.

VALVE MECHANISM.

1,084,992.  Specification of Letters Patent.  Patented Jan. 20, 1914.

Application filed June 29, 1911.  Serial No. 636,031.

*To all whom it may concern:*

Be it known that I, JAMES WILSON, a subject of the King of the United Kingdom of Great Britain and Ireland, residing at Brisbane, Queensland, Australia, have invented new and useful Improvements in Valve Mechanism, of which the following is a specification.

The present invention relates to valve mechanism for engines, and consists in the combinations and arrangements of elements hereinafter disclosed and particularly set forth in the accompanying claims.

The invention has for its purpose to provide a valve mechanism which will insure quiet operation; provide clear openings for the valve passageways; which will obviate requiring the valves proper crossing said passages; and one wherein the construction of parts will be simple and may be easily assembled and disassembled.

The invention is shown by way of illustration in the accompanying drawings, wherein:

Figure 1 is a central sectional view of an engine cylinder equipped with the valve mechanism, showing parts thereof removed, and parts in elevation, and with the fuel inlet fully open. Fig. 2 is a similar view showing the fuel inlet closed and the exhaust passage open. Fig. 3 is a top plan view of the valve actuating crank shaft. Fig. 4 is a view similar to Figs. 1 and 2 and showing the position of parts at about the end of the exhaust and the beginning of the suction stroke of the piston. Fig. 5 is a like view showing the relation of parts with the piston on the first half of its suction stroke. Fig. 6 shows the parts at the end of the suction stroke and the starting of the compression stroke of the piston. Fig. 7 is a modified construction and shows the parts at the end of the compression and starting of the ignition. Fig. 8 shows the parts on the finish of the explosion and starting of the exhaust. Fig. 9 shows the exhaust fully open, at the end of the exhaust stroke of the piston. Fig. 10 is a view similar to Figs. 1 and 2 illustrating a modified form of valve actuating mechanism. Fig. 11 is a top plan view of the cam shaft employed in Fig. 10. Fig. 12 shows the position of parts with the modified form of mechanism, when the exhaust is fully open. Fig. 13 is a top plan view, similar to Fig. 11, with the cam shaft removed. Fig. 14 is a central sectional view taken at right angles to Figs. 10 and 12. Fig. 15 is a part elevation and transverse sectional view of the valve actuating shaft, showing the coupling connection thereof. Fig. 16 illustrates the driving gear for the valve actuating shaft. Fig. 17 is a central sectional view of the construction shown in Figs. 1 and 2 and taken at right angles thereto, and Fig. 18 is a partial top plan sectional view of the cylinder head construction.

Referring to the construction in further detail, C designates the engine cylinder having a head $G^x$ and a cover $C'$ therefor, and a hood or casing $V^b$ is mounted on said cover and incloses the valve mechanism to be described. A water jacket W is formed in the cylinder and cylinder head, as shown. The head $G^x$ is formed with a cylindrical extension $C^2$ providing the valve working chamber, and a plurality of ports $G'$ are formed in the head to provide inlet passages for the gas or other fuel from the surrounding chamber G of the cap $C'$. The head extension $C^2$ provides an annular space $E^3$ with the edge of the cylinder C and forms an exhaust outlet E (see Figs. 1 and 2).

The valve mechanism consists of a sleeve $E^2$ mounted to operate within the head extension $C^2$, and adapted to engage with the seat X on the cylinder C at the exhaust passageway E, and control said passageway. The sleeve $E^2$ is formed with a plurality of ports $G^2$ adapted to register with the inlet passages $G'$ formed in the cylinder head $G^x$, as illustrated in Figs. 1, 2, 4 and 5. The sleeve is further provided with an annular shoulder $E^x$ which is engaged and lifted by a second sleeve $E'$ mounted to operate with in the sleeve $E^2$ as shown. The second sleeve $E'$ is constructed with a part $E'^x$ that co-operates with the sleeve $E^2$ to control the exhaust passageway $E^3$, as shown in Figs. 2, 4 and 5. A plurality of ports A, and $A'$ chamber A', are formed in the sleeve E', and have for their purpose to coöperate with the ports G' and G² for admitting fuel into the cylinder chamber, as illustrated in Fig. 5. A seat X' is formed on the second sleeve E' adjacent the ports A for a third sleeve S' that is mounted to operate within the second sleeve E' and controls the ports A thereof. The inner diameters of the third sleeve S', and the extended portion E'' of the second sleeve, are the same, and provide a working chamber for a piston S which coöperates with said third sleeve, and the second sleeve extension, to open and close the passage therebetween, i. e. around the valve seat X' as disclosed in Figs. 4 and 5. A shoulder S'' is provided on the third sleeve S' for engaging with the upper portion of the piston S to raise said third sleeve from its seat X' at the proper periods in the operation of the engine, as will be hereinafter explained.

The means for operating the valve sleeves and piston comprises a shaft V adapted to be driven from the main engine shaft Z by bevel wheels M and miter wheels B, or in any other well known manner (see Fig. 16). Shaft V is made up of two sections connected by a coupling comprising a pair of disks V' secured together by a pin V² (see Fig. 3). The cranked portions E⁷ of the shaft V are connected to operate the second sleeve E' by a pair of rods E⁵ engaging with pins P' carried by said sleeve (see Fig. 17). A piston rod S² connects the crank portions S⁶ with the piston S by a gudgeon pin P. The crank shaft connecting rods S² and E⁵ positively operate the second sleeve and the piston from the shaft V, as above stated, and said second sleeve and piston in turn operate the first and third sleeves to unseat said sleeves by engaging with their respective shoulders E<sup>x</sup> and S''. The first sleeve is operated downwardly, or seated, through the medium of a plurality of springs S⁴ mounted on bolts S⁵ on the cylinder head cover C', and engaging with said first sleeve as illustrated in Fig. 5. And in like manner the third sleeve S' is adapted to be moved downwardly, or seated, through the medium of a plurality of springs S³ contained within registering recesses S⁸ formed in the second and third sleeves, as shown in Figs. 4 and 5.

In the modified construction shown in Figs. 7, 10, 11, 12 and 14, the first sleeve is operated by a pair of cams E⁶ mounted on the crank shaft V, and engaging with rollers R mounted in suitable brackets R³ carried by the first sleeve. When using this construction it is proposed to employ springs S⁷ (see Fig. 7) for raising the sleeve from its seat X. Said springs S⁷ are mounted on the cylinder head closure C' and fit within recesses S⁹ formed in the sleeve. The inner or third sleeve S' is actuated by cams S¹⁰ mounted on the shaft V and engaging with rollers R' mounted on rods R² carried by said sleeve. A seat X is provided in the cylinder head for the exhaust sleeve E², and a seat X' provided on the exhaust sleeve E' for the suction sleeve S'. The valve-actuating shaft V is driven from the main engine shaft Z by bevel wheels M and miter wheels B, or in any other well known manner.

In Fig. 1, F denotes the position of the top of the engine piston when the valve mechanism is in the position shown in Figs. 1, 2, 5, 9 and 12; F' denotes the position of the top of the engine piston when the valve mechanism is in the position shown in Figs. 4 and 7; and F² indicates the position of the top of the engine piston when the valve mechanism is in the position shown in Figs. 6 and 8.

The operation of my invention is as follows: When the engine piston is in its outer, or upper, position F', just at the beginning of its suction stroke, the valve mechanism will be in the position shown in Fig. 4; the inlet ports being closed and the exhaust port E³ almost closed by the exhaust sleeve E². When the engine piston has traveled through the first half of its suction stroke, the valve-actuating cranks E⁷ and S⁶ will have been rotated through 45°, and the parts will be shifted to the position shown in Fig. 5; the exhaust piston E' being shifted downwardly by the cranks E⁷ sufficiently to carry the ports G³ past the lower end of the suction sleeve S⁸, and to permit the springs S⁴ to close the exhaust port E³ by the exhaust sleeve E². In this position, of the valve mechanism, the gas chamber G is fully open to the engine cylinder C through the ports G' and G³ and past the lower end of the suction piston S (see Fig. 5). During the last half of the suction stroke of the engine piston, the valve-actuating cranks E⁷ and S⁶ will be further rotated through 45° to shift the valve mechanism from the position shown in Fig. 5 to the position shown in Fig. 6, the exhaust sleeve E' being shifted downward by the cranks E⁷, and the suction piston S simultaneously shifted downward to a greater extent by the crank S⁶ for permitting the springs S³ to seat the suction sleeve S' at X' to close the ports G³ leading to the gas chamber G. In this position, both the gas chamber G and exhaust chamber E are closed to the engine cylinder C. The engine piston then begins its compression stroke; the gas chamber G and exhaust chamber E being closed to the engine cylinder C throughout the entire compression stroke, and the valve mechanism being in the position shown in Fig. 7 at the completion of said stroke. The compressed charge is then ignited, and the engine piston begins its power stroke; the gas chamber G and exhaust chamber E being closed to the engine cylinder C until near the completion of said power stroke, when the valve mechanism is shifted to the position shown in Fig. 8. In this position of the parts, the exhaust sleeve E' has been shifted upwardly by the cranks E⁷ to raise the exhaust sleeve E² and partially open the exhaust port E³, and the suction piston S has been simultaneously shifted upwardly within said exhaust sleeve E'. The exhaust sleeve then begins its exhaust stroke, and during the early portion of said stroke the exhaust sleeve E' is further shifted upward to fully open the exhaust port E³; the position of the valve mechanism at the completion of the first half of the exhaust being shown in Fig. 9. The exhaust port E³ is maintained fully open until near the completion of the exhaust stroke, when the valve mechanism is shifted to the position indicated in Fig. 4, and the above steps are then repeated during the operation of the engine.

Figs. 10, 11, 12, 13 and 14 illustrate the above described valve mechanism with cams E⁶ and S¹⁰ substituted for the springs S⁴ and S³, and further description thereof is unnecessary.

It is obvious that those skilled in the art may vary the details of construction and arrangement of parts without departing from the spirit of my invention, and therefore I do not wish to be limited to such features except as may be required by the claims.

I claim:

1. The combination of an engine cylinder having an inlet and an exhaust passage, and a valve seat; a valve mechanism controlling said passages comprising a slotted sleeve mounted in the cylinder to engage with said seat, and adapted to open and close said passages, sleeves and a piston mounted to operate within said first named sleeve; said last named sleeves and the piston constructed to coöperate with the first named sleeve to provide communication between the inlet and exhaust passages and the cylinder chamber; and to close said passages; and means for operating said sleeves and the piston, substantially as described.

2. The combination of an engine cylinder having an inlet and an exhaust passage; a valve mechanism controlling said passages comprising a sleeve mounted to operate in the cylinder, a second sleeve operable within the first named sleeve, a third sleeve operable within said second sleeve, a piston operable within the third sleeve, and means for operating said sleeves and piston, said sleeves and piston constructed to provide communication between the inlet and exhaust passages and the cylinder chamber, and to close said passages, substantially as described.

3. The combination of an engine cylinder having an inlet and an exhaust passage, and a valve seat; a valve mechanism controlling said passages comprising a slotted sleeve mounted in the cylinder to engage with said seat, and adapted to open and close said passages, a second and slotted sleeve operable within the first named sleeve and provided with a seat, a third sleeve operable within the second sleeve and adapted to engage with its seat, and open and close the passage through the slots in said second sleeve, a piston operable within said second and third named sleeves and adapted to open and close the passages therebetween to the engine cylinder chamber; and means for operating said sleeves and the piston, substantially as described.

4. The combination of an engine cylinder having a head provided with an inlet and an exhaust passage, and having a seat; a valve mechanism controlling said passages comprising a sleeve having a shoulder operable within the cylinder head to open and close said passages, resilient means for seating the sleeve on said seat, a second sleeve operable within the first named sleeve, said second sleeve provided with a seat, a third sleeve having a shoulder and operable within the second sleeve, resilient means for seating the third sleeve on the seat of the second sleeve, a piston operable within the third sleeve, and means for operating said second named sleeve and the piston, the second sleeve adapted to engage the shoulder of the first sleeve to raise the latter, the piston adapted to engage the shoulder of the third sleeve to raise the latter; and said sleeves and the piston constructed to provide communication between the inlet and exhaust passages and the cylinder, and to close said passages, substantially as described.

5. The combination of an engine cylinder having a head provided with annular inlet and exhaust passages, and having a valve seat; a valve mechanism controlling said passages comprising a shoulder sleeve having slots disposed adjacent the inlet passage, and adapted to engage said seat adjacent the exhaust passage; a second sleeve operable within the first named sleeve; said second sleeve having slots disposed adjacent the slots of the first sleeve, and a part for opening and closing the inlet passage between the first sleeve and the valve seat; said second sleeve having a valve seat; a third sleeve operable within the second sleeve and provided with a shoulder, said third sleeve adapted to engage with the valve seat of the second sleeve for opening and closing the inlet passage through the slots thereof; a piston operable within the third sleeve and adapted to open and close the inlet passage between the second and third sleeves; a crank shaft adapted to be driven from the engine; driving connections between the second sleeve and piston and the crank shaft; resilient means for seating the first sleeve;

and resilient means for seating the third sleeve on the second sleeve; said second sleeve adapted to engage the shoulder of the first sleeve for unseating the latter, and said piston adapted to engage the shoulder of the third sleeve for unseating the latter, substantially as described.

In testimony whereof I have signed my name to this specification in the presence of two subscribing witnesses.

JAMES WILSON.

Witnesses:
E. CALLEN ABELL.
OLIVE K. ABELL.